J. H. BRADY.
ADJUSTABLE TRAP.
APPLICATION FILED NOV. 9, 1908.
934,035.
Patented Sept. 14, 1909.
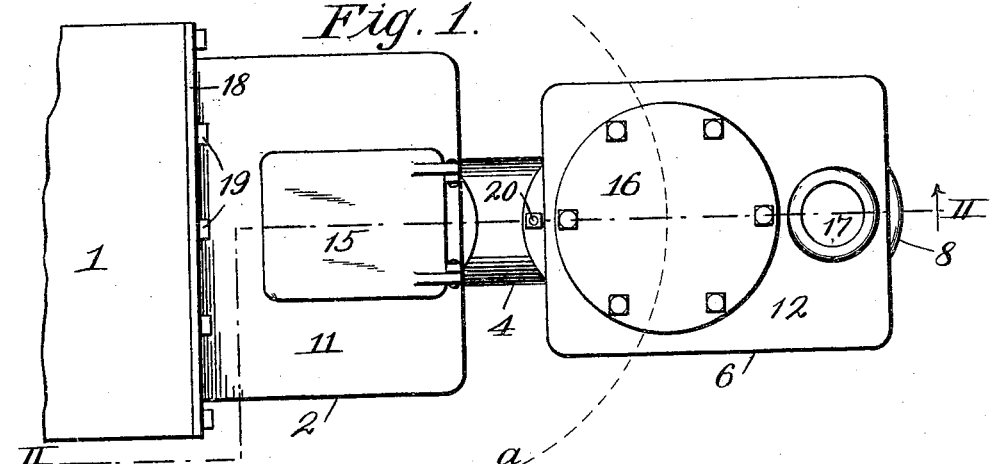
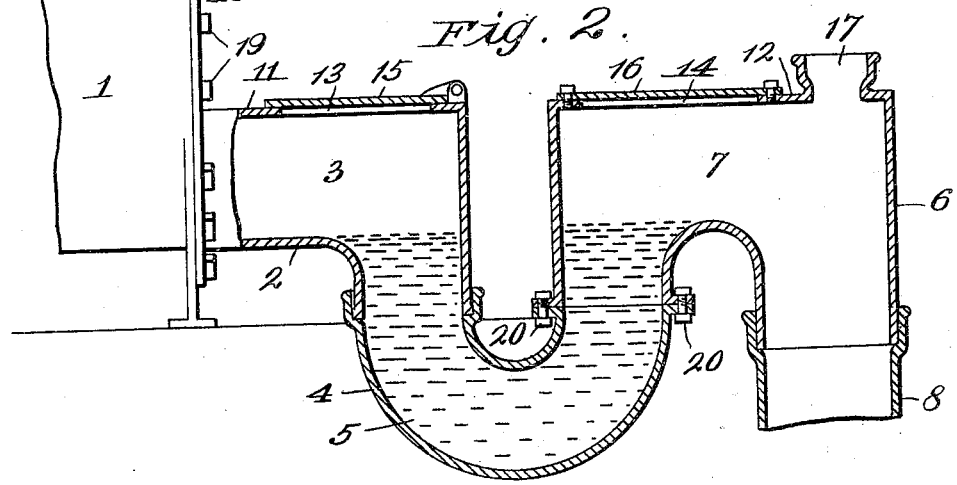
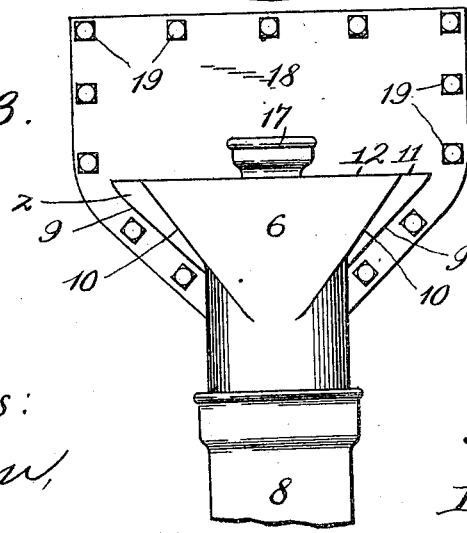
Witnesses:
D. J. Allen
M. Cox
Inventor:
Joseph H. Brady,
By F. G. Fischer,
Atty.

though which access may be had to
UNITED STATES PATENT OFFICE.

JOSEPH H. BRADY, OF KANSAS CITY, MISSOURI.

ADJUSTABLE TRAP.

934,035.  Specification of Letters Patent.  Patented Sept. 14, 1909.

Application filed November 9, 1908. Serial No. 461,702.

*To all whom it may concern:*

Be it known that I, JOSEPH H. BRADY, a citizen of the United States, residing at Kansas City, in the county of Jackson and State of Missouri, have invented certain new and useful Improvements in Adjustable Traps, of which the following is a specification.

My invention relates to improvements in adjustable traps, and it consists of a stationary section and one or more adjustable sections.

One of my objects is to provide a simple device of this character which is especially adapted for use in connection with closets, urinals, and the like.

A further object is to provide a trap which can be readily cleaned out in case it becomes stopped up.

Another object is to provide a trap having a discharge end which can be swung around at an angle to its inlet end to avoid a wall or other obstacle and thus permit the trap to be installed in a space too limited to receive an ordinary trap.

Other objects of the invention will hereinafter appear, and in order that said invention may be fully understood, reference will now be made to the accompanying drawing, in which:

Figure 1 represents a plan view of my improved trap. Fig. 2 is a vertical sectional view of the trap, taken on line II—II of Fig. 1. Fig. 3 is an end view of the trap.

In the drawing I have shown the trap communicating with the discharge end of a latrine 1. Said trap consists of a primary section 2 forming an inlet chamber 3, which communicates with the latrine, a second section 4 forming a segmental sealing chamber 5, and a third section 6 forming an outlet chamber 7, the discharge end of which communicates with a soil-pipe 8.

Chambers 3 and 7 have upwardly-diverging walls 9 and 10, united by tops 11 and 12, provided with openings 13 and 14, respectively, through which access may be had to both sides of the sealing chamber for the purpose of cleaning out the same should it become stopped up. Openings 13 and 14 are normally closed by lids 15 and 16, respectively. Section 6 is also provided with a vent 17, adapted to receive the ordinary vent-pipe (not shown) for conducting any sewer-gas which may arise in chamber 7 to the exterior of the building containing the trap. Section 2 is provided at its inlet end with a large flange 18 for closing the discharge end of the latrine to which it is secured by screws 19. Section 4 has its inlet end swiveled to the outlet end of section 2, so that it may be swung around to either side of the latter, as indicated by arrow *a*, and thus permit the trap to be installed in a space too limited to receive an ordinary trap. After section 4 has been properly adjusted with respect to section 2, the swiveled joint is calked, or otherwise rendered water and gas tight. Section 6 may be formed integral with section 5, but I prefer to secure it thereto by means of bolts 20, as shown in Fig. 2.

From the above description it is apparent that I have produced a simple and efficient trap, and while I have shown and described the preferred form of my invention, I, of course, reserve the right to make such changes as properly fall within the spirit and scope of the invention.

Having thus described my invention, what I claim is:—

1. An adjustable trap comprising a segmental member forming a water-seal and inlet and outlet members secured to the respective arms of said segmental member, said members being substantially V-shaped in cross section and having covered openings above the arms of said segmental member.

2. An adjustable trap comprising a segmental member forming a water seal, an inlet member swiveled to one arm of said segmental member and an outlet member secured to the opposite arm of said segmental member, said inlet and outlet members being substantially V-shaped in cross section and having covered openings above the arms of said segmental member.

3. An adjustable trap comprising an inlet member, an outlet member and an intermediate water-seal, said members being substantially V-shaped and having horizontal open tops, and one of said members being radially adjustable with relation to said top and the other member.

In testimony whereof I affix my signature, in the presence of two witnesses.

JOSEPH H. BRADY.

Witnesses:
  F. G. FISCHER,
  M. COX.